US006735517B2

(12) United States Patent
Engelsberg et al.

(10) Patent No.: US 6,735,517 B2
(45) Date of Patent: May 11, 2004

(54) WINDSHIELD DISPLAY FOR A NAVIGATION SYSTEM

(75) Inventors: Andreas Engelsberg, Hildesheim (DE); Sven Bauer, Hildesheim (DE); Holger Kussmann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 22 days.

(21) Appl. No.: 10/089,669

(22) PCT Filed: Jul. 28, 2001

(86) PCT No.: PCT/DE01/02864
§ 371 (c)(1),
(2), (4) Date: Jul. 29, 2002

(87) PCT Pub. No.: WO02/10838
PCT Pub. Date: Feb. 7, 2002

(65) Prior Publication Data
US 2003/0078728 A1 Apr. 24, 2003

(30) Foreign Application Priority Data
Aug. 2, 2000 (DE) .......................................... 100 37 573

(51) Int. Cl.[7] ................................................ G06F 17/00
(52) U.S. Cl. ........................................ 701/209; 701/211
(58) Field of Search ................................ 701/209, 211, 701/200, 23; 73/178 R

(56) References Cited

U.S. PATENT DOCUMENTS 5,360,971 A    11/1994  Kaufman et al.
5,422,812 A *  6/1995  Knoll et al. ................. 701/209
6,140,957 A * 10/2000  Wilson et al. ......... 342/357.08
6,285,952 B1 *  9/2001  Kim ........................... 701/211
6,480,148 B1 * 11/2002  Wilson et al. ......... 342/357.08
6,532,113 B2 *  3/2003  Aoki et al. ................. 359/630

FOREIGN PATENT DOCUMENTS

| DE | 38 22 222 | 1/1990 |
| DE | 39 05 493 | 8/1990 |
| DE | 40 35 979 | 6/1991 |
| DE | 44 12 859 | 11/1994 |
| DE | 195 16 964 | 11/1996 |
| FR | 26 65 564 | 2/1992 |
| FR | 2 706 824 | 12/1994 |
| WO | WO 98 28649 | 7/1998 |
| WO | WO 99 41637 | 8/1999 |

* cited by examiner

Primary Examiner—Yonel Beaulieu
Assistant Examiner—Olga Hernandez
(74) Attorney, Agent, or Firm—Kenyon & Kenyon

(57) ABSTRACT

A navigation method for a motor vehicle is described, the purpose of which is to display an arrow as a directional symbol on a windshield as a function of signals from a viewing direction recognition device, with the directional information being determined by a navigation device When approaching a turn-off to be selected, the arrow moves in the direction of the turn-off. In addition, the arrow becomes shorter and/or changes color and/or its flashing frequency. A rotation of the arrow on the windshield as a function of the stipulated route is also possible. The projection apparatus, to which the navigation device is connected, has means for placing the arrow in the field of vision of the driver.

6 Claims, 2 Drawing Sheets

WINDSHIELD DISPLAY FOR A NAVIGATION SYSTEM

FIELD OF THE INVENTION

The present invention is directed to a navigation method in a motor vehicle.

BACKGROUND INFORMATION

From French Published Patent Application No. 27 068 24, it is already known to combine a navigation system with a head-up display, i.e., a windshield projection apparatus. There, an arrow is projected by a projection apparatus in the dashboard onto a special field on the windshield, with the arrow being rotated as a function of signals from the navigation device. The arrow then points in the direction of the route determined by the navigation device.

SUMMARY OF THE INVENTION

The navigation method in a motor vehicle according to the present invention, has the advantage over the related art that, in combination with a viewing direction recognition device, the directional symbol placed on the windshield is placed optimally in the field of vision of the driver. In addition, the directional symbol points in the direction of the selected route. The preferred directional symbol is an arrow. This has the additional advantage that the arrow on the windshield moves in the direction indicated, announcing an approaching turn-off to be selected. A driver thus intuitively receives references, particularly useful in city traffic, which he can use to optimally select his route. This affords higher driving comfort, a shortening of drive times, and increased safety, since the driver is not distracted by looking at a display of the navigation device, but at the directional symbol that is placed in the driver's field of vision.

Another advantage is that when there is a change in the field of vision, such as during seat adjustment, the directional symbol is arranged in the driver's field of vision so that it precisely points in the direction to be selected; in other words, in the case of a turn-off, the arrow is always situated in such a way that it is always displayed exactly at the turn-off for the driver, who is monitored by the viewing direction recognition device. The driver sees the turn-off in a certain field of the windshield, which is exactly where the arrow, the directional symbol, is located. This has the advantage that the driver is not confronted with any ambiguity; when he sees the arrow, he knows exactly where to turn off.

Of particular advantage is the fact that the arrow, used as the directional symbol, is shortened when approaching a turn-off to be selected, thus additionally alerting the driver that he has to select a turn-off shortly. This, too, is very useful for the driver, since he is being prepared for having to select a turn-off, allowing him to better find his way, especially in unfamiliar surroundings.

A further advantage is the fact that, upon approaching a turn-off to be selected, the arrow changes color and flashing frequency in order to intuitively inform the driver of the approach. This, too, provides the driver with a better orientation.

Another advantage is the fact that the arrow is rotated on the windshield as a function of signals from the navigation device, so that even when approaching from some distance, the driver is alerted to a turn-off to be selected later.

Finally, it is also advantageous that the navigation device is connected to a viewing direction recognition device in order to implement the method according to the present invention, and that the projection apparatus with which the navigation device is connected has an arrangement for placing the arrow on the windshield in such a way that the arrow can be placed anywhere within a large field on the windshield. This can be achieved through an intelligent lens technology, through control by an electric motor of the projection apparatus, or through micromechanical elements which control the light beam accordingly.

DETAILED DESCRIPTION

The use of so-called head-up displays makes it possible to provide the driver with information within his field of vision. According to the present invention, therefore, a navigation device is connected to a viewing direction recognition device, so that directional symbols projected onto a windshield are displayed as a function of the viewing direction recognition device. This makes it possible to place the directional symbols, hereinafter arrows, in the driver's field of vision in an optimum manner. Furthermore, the driver can be intuitively alerted of an approach to a turn-off to be selected by various measures of the directional symbol. This is achieved by the fact that the arrow moves in the direction of the turn-off when the vehicle approaches a turn-off and, in a refinement of the present invention, when the color of the arrow changes while approaching a turn-off, or by a change in the flashing frequency of the directional symbol. The rotation of the arrow in the direction to be selected can alert a driver even at some distance from a turn-off that a turn-off is coming up later. The projection apparatus with which the navigation device is connected has an arrangement to optimally place the arrow in the driver's field of vision on the windshield.

In the following, a turn-off designates a side street or the destination of the route itself, when the destination has been reached.

Figure 1:
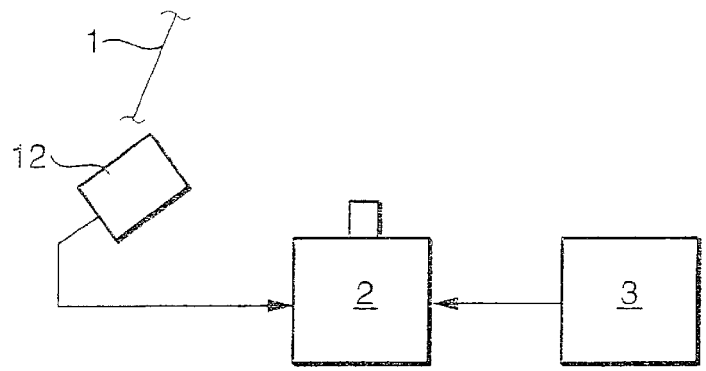
FIG. 1 shows a block diagram of the navigation device according to the present invention.

In FIG. 1, the navigation device according to the present invention is represented as a block diagram. Navigation device 3 is connected via a data output to a projection apparatus 2 as the image-generating device. Projection apparatus 2 is set up to place images on windshield 1. Projection apparatus 2 is connected to viewing direction recognition device 12 via a second data input, with viewing direction recognition device 12 directed toward the driver's field of vision.

Viewing direction recognition device 12 makes it possible to recognize the viewing direction of the driver and signal the driver's field of vision to projection apparatus 2, so that the projection apparatus 2 places the directional symbol, or arrow, to be displayed on windshield 1 in that field of vision. The arrow is displayed so that the arrow points precisely to the turn-off. For this purpose, projection apparatus 2 uses data from navigation device 3, based on the location of the motor vehicle, the distance of the motor vehicle from the turn-off, and the signals from the viewing direction recognition device, in order to project the arrow onto windshield 1, so that the arrow points precisely to the turn-off. Viewing direction recognition device 12 is a camera with subsequent image processing. The viewing direction recognition device is able to determine the position of the driver's eyes.

The driver inputs a destination at navigation device 3. Navigation device 3 then calculates one or more routes, from which a route is selected by the driver, or automatically by navigation device 3. Navigation device 3 has a processor for calculating the routes. Navigation device 3 instructs projection apparatus 2 which directional symbol to select and in which direction the directional symbol, in other words the arrow, is to be placed. This is determined depending on the location of navigation device 3 and the selected route. For determining the location, navigation device 3 has a locator, in this case a GPS (Global Positioning System)-receiver, and a rotational speed sensor. This makes it possible to determine the distance between the motor vehicle and a turn-off.

Projection apparatus 2 may have arrows available for various stages of approach and indication of direction. These different arrows are then stored in a memory for projection apparatus 2. Alternatively, the arrows can be projected in a continuously-adjustable manner. In this case, projection apparatus 2 has a processor which calculates this continuously-adjustable display of the arrow.

Figure 2A:
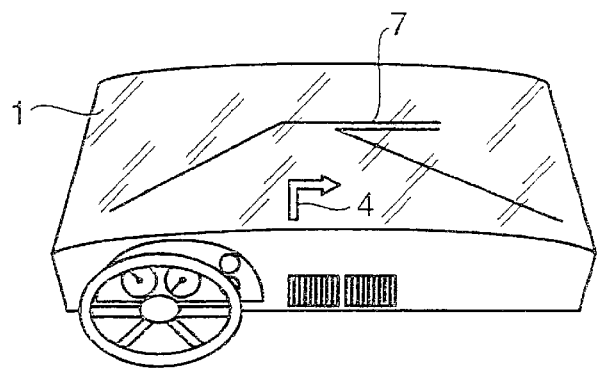
FIG. 2a shows a first example of an approach to a turn-off to be selected.
Figure 2B:
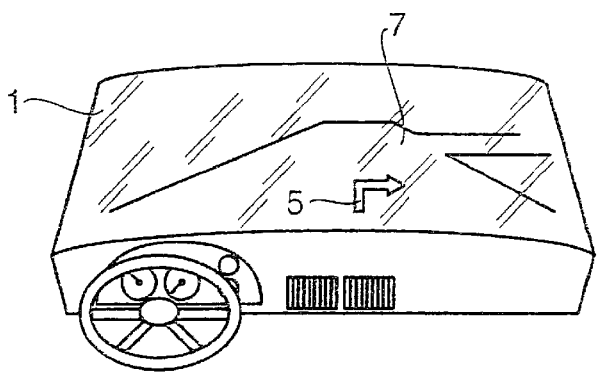
FIG. 2b shows a second example of an approach to a turn-off to be selected.
Figure 2C:
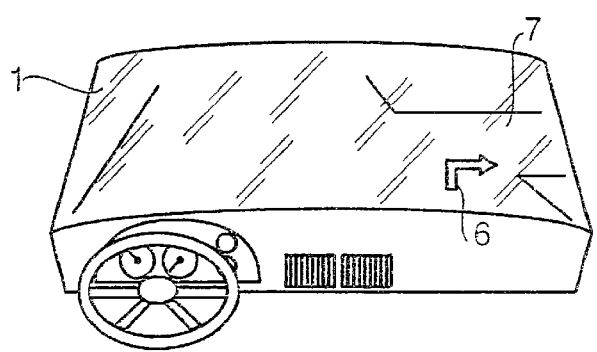
FIG. 2c shows a third example of an approach to a turn-off to be selected.

FIGS. 2a, 2b and 2c show an approach to a turn-off in stages, where the arrow moves in the direction of the turn-off and also becomes shorter. FIG. 2a shows windshield 1, where arrow 4, generated by projection apparatus 2, is displayed on the windshield. A road which has a turn-off 7 is visible through windshield 1. According to the route the driver entered, he has to select turn-off 7, and this is why arrow 4 points in the direction of that turn-off. The route is calculated by navigation device 3, based on the destination input and the current location of navigation device 3. Selection parameters affecting the calculation of the route may be preset by the driver. This includes, for instance, whether the fastest route or the shortest route is to be calculated. It is possible that there will be several routes to choose from. Navigation device 3 has an input device for entering and selecting routes.

FIG. 2b shows that the driver is now considerably closer to turn-off 7. Therefore, arrow 5 now moves in the direction of turn-off 7, and arrow 5, due to the approach to turn-off 7, has become shorter compared to arrow 4, in order to indicate upcoming turn-off 7.

In FIG. 2c, the driver is now close to turn-off 7, so that arrow 6 has continued to move in the direction of turn-off 7 and has become even shorter, in order to indicate imminent turn-off 7.

The approach to turn-off 7 can be supported by a change in color of the arrow and a higher flashing frequency of the arrow. It is also possible that the arrow rotates at the same time, in order to effect a two-dimensional movement of the arrow. The rotation is therefore visible in addition to the travel and the shortening. The movement of the arrow as the directional symbol can then take place in one dimension, since the direction is achieved in particular by the rotation of the arrow.

Figure 3:
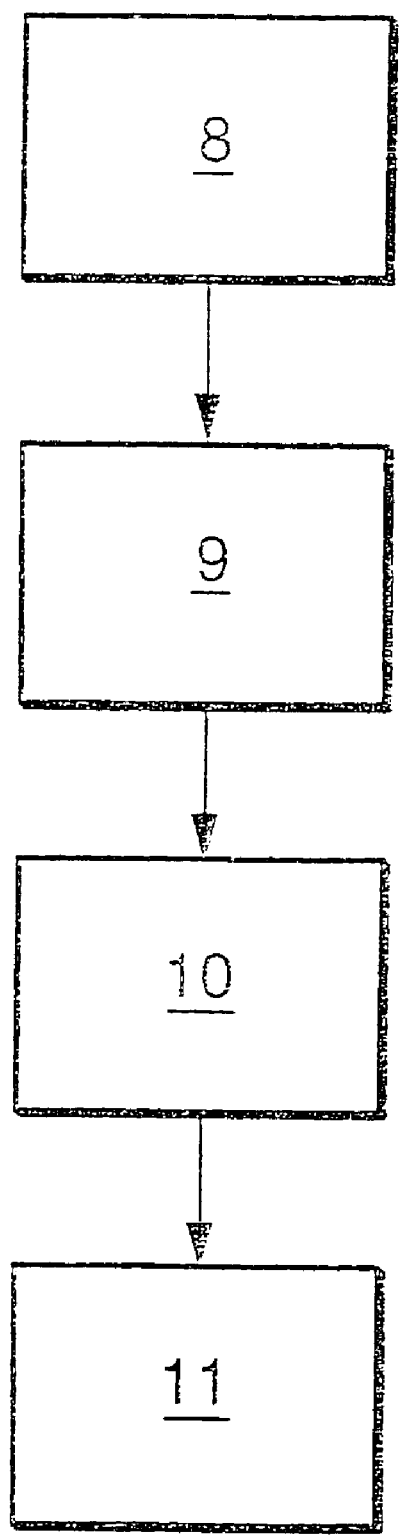
FIG. 3 shows a flow chart of the method according to the present invention.

FIG. 3 shows the navigation method in a motor vehicle as a flow chart. In step 8, the driver inputs a destination. In step 9, navigation device 3, having an input device for entering the destination, then calculates the routes to the destination, based on the location of the driver. The driver then selects the most appropriate route via the input device of navigation device 3, or an optimal route is selected automatically based on the entered parameters. The directional symbols for this route are then generated.

In step 10, these directional symbols are displayed as arrows, as shown in FIGS. 2a through 2c. In step 11, the arrow is placed on the windshield according to the signals from viewing direction recognition device 12 and navigation device 3, so that the arrow is always in the field of vision of the driver and points precisely to a turn-off. Especially in the case of a rotatable arrow, an adaptation of the angle to the change in eye level is necessary. Such an adaptation is not necessary when driving straight ahead. If the driver temporarily looks away, projection apparatus 2 selects a standard setting in the center of windshield 1. The setup may also be configured so that the driver opts to use only this standard setting for the directional symbol. This input is effected via navigation device 3.

What is claimed is:

1. A navigation method for performance in a motor vehicle, comprising:
    displaying a directional symbol on a windshield as an indicator from a navigation device and as a function of a selected route, wherein:
        the directional symbol is displayed as a function of a signal from a viewing direction recognition device; and
    causing the directional symbol to move on the windshield in a direction of a turn-off when approaching the turn-off to be selected.

2. A navigation method for performance in a motor vehicle, comprising:
    displaying a directional symbol on a windshield as an indicator from a navigation device and as a function of a selected route, wherein: the directional symbol is displayed as a function of a signal from a viewing direction recognition device; and
    causing the directional symbol to move on the windshield in a direction of a turn-off when approaching the turn-off to be selected:
    wherein:
        the directional symbol becomes shorter when approaching the turn-off to be selected.

3. A navigation method for performance in a motor vehicle, comprising:
    displaying a directional symbol on a windshield as an indicator from a navigation device and as a function of a selected route, wherein: the directional symbol is displayed as a function of a signal from a viewing direction recognition device; and
    causing the directional symbol to move on the windshield in a direction of a turn-off when approaching the turn-off to be selected;
    wherein:
        the directional symbol at least one of changes color and flashes with a variable frequency when approaching the turn-off to be selected.

4. A navigation method for performance in a motor vehicle, comprising:
    displaying a directional symbol on a windshield as an indicator from a navigation device and as a function of a selected route, wherein: the directional symbol is displayed as a function of a signal from a viewing direction recognition device;
    causing the directional symbol to move on the windshield in a direction of a turn-off when approaching the turn-off to be selected; and rotating the directional symbol on the windshield as a function of the selected route.

5. A navigation device, comprising:

an input device;

a processor for calculating a selected route;

an arrangement for displaying a directional symbol on a windshield as an indicator from a navigation device and as a function of the selected route, wherein:

the directional symbol is displayed as a function of a signal from a viewing direction recognition device; and an arrangement for causing the directional symbol to move on the windshield in a direction of a turn-off when approaching the turn-off to be selected, wherein:

the navigation device is capable of being connected to a projection apparatus and to the viewing direction recognition device.

6. The navigation device according to claim 5, wherein:

the projection apparatus includes an arrangement for placing the directional symbol on the windshield.

\* \* \* \* \*